2,704,244
Patented Mar. 15, 1955

2,704,244

DITHIOBIURET AND DERIVATIVES THEREOF AS DEFOLIANT ACTIVATORS

Lyle D. Goodhue and Roy E. Stansbury, Bartlesville, Okla., assignors to Phillips Petroleum Company, a corporation of Delaware No Drawing. Application January 12, 1953,
Serial No. 330,900

25 Claims. (Cl. 71—2.6)

This invention relates to plant defoliation. In one aspect, it relates to a novel plant-defoliating composition. In another aspect it relates to a novel composition of matter comprising dithiobiuret and selected derivatives thereof. In another aspect, it relates to a method and a composition for activating plant defoliants, such as organic sulfides.

Plant defoliating agents are used to expedite the harvest of cotton, soybeans, tomatoes and other crops. Their purpose is to provide an effect similar to that produced by a light frost, namely dropping of the leaves from the plant. A frost or other shock to the plant foliage causes the plant to react by forming abscission layers of cells across the petiole of the leaves which results in leaf drop. In the case of cotton, defoliation is especially desirable whether the crop is mechanically picked or hand picked. For example, defoliating at a certain stage in the life of cotton plants causes uniform opening of bolls and permits substantially complete picking in a single pass. Other advantages such as clean product, elimination of insect pests and the like are also realized from timely defoliation of growing cotton. In the case of tomatoes, string beans, and the like, the harvest is expedited by defoliation, since the pickers do not have to search for the crop. In a similar manner other plants may be advantageously defoliated with resultant benefits such as forced ripening of fruit, ease of picking and the like.

It has been disclosed that organic polysulfides of the general formula $RS_{(x)}R'$ wherein R and R' represent straight or branched-chain alkyl groups, cycloalkyl groups, aryl groups, combinations thereof such as alkyl, cycloalkyl, alkaryl, and the like, (x) represents an integer from 2 to 5, and R and R' each contain at least 3 and not more than 10 carbon atoms and are not necessarily identical, are plant defoliating agents. Typical polysulfides within the scope of the above formula when (x) is two include di-tert-hexyl disulfide, di-tert-octyl disulfide, di-tert-decyl disulfide, di-n-hexyl disulfide, di-cyclohexyl disulfide, and the like. When (x) is 3 or more, typical compounds include di-tert-butyl polysulfide, di-tert-hexyl polysulfide, di-n-butyl polysulfide, and the like. Disclosure of said materials as plant defoliants is covered in Serial No. 153,994, filed April 4, 1950, by Lyle D. Goodhue and Carolyn E. Tissol.

According to this invention, the defoliating activity of organic polysulfides of the type mentioned hereinbefore is increased by adding to said polysulfides an activating amount of a dithiobiuret represented by the formula

wherein R is one of hydrogen and an organic radical selected from the group consisting of alkyl, cycloalkyl, aryl, aralkyl, and alkaryl radicals each containing less than eleven carbon atoms.

The terms "alkyl," "aryl," "aralkyl," "cycloalkyl," and "alkaryl" are intended to mean radicals consisting of carbon and hydrogen chemically combined in configurations known to the art.

In accordance with the invention, the R's in the foregoing formula may be identical or different radicals.

Typical dithiobiurets within the scope of the invention, together with their formulae, are as follows:

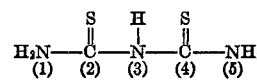
2,4-dithiobiuret

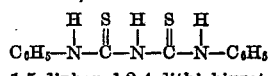
1,5-diphenyl-2,4-dithiobiuret

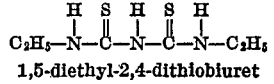
1,5-diethyl-2,4-dithiobiuret

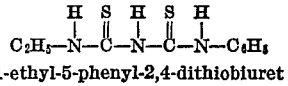
1-ethyl-5-phenyl-2,4-dithiobiuret

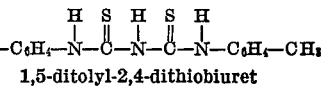
1,5-ditolyl-2,4-dithiobiuret

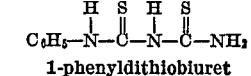
1-phenyldithiobiuret

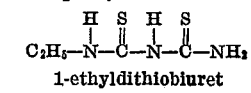
1-ethyldithiobiuret

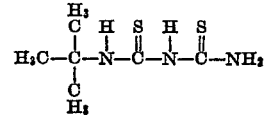
1-t-butyldithiobiuret

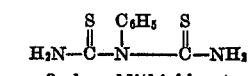
3-phenyldithiobiuret

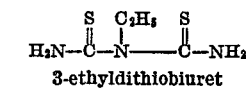
3-ethyldithiobiuret

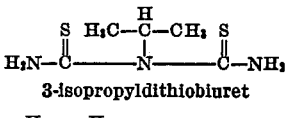
3-isopropyldithiobiuret

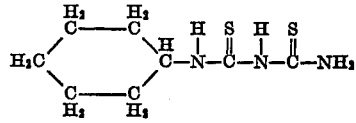
1-cyclohexyldithiobiuret

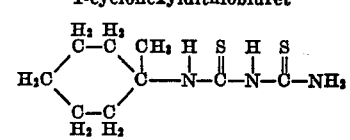
1-(1-methylcyclohexyl)-dithiobiuret

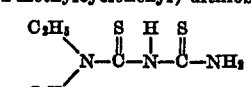
1,1-diethyldithiobiuret

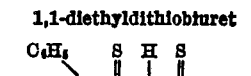
1,1-diphenyldithiobiuret

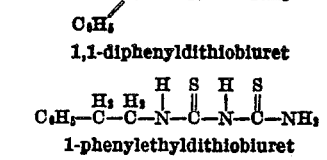
1-phenylethyldithiobiuret

When used in combination with the foregoing polysulfides in the manner taught by the present invention, our activators provide compositions having greater plant defoliating activity than said polysulfides. Compounds of the present invention are known in the art and methods for their production are also known in the art.

The activators of the present invention can be employed in admixture with a single organic polysulfide or mixture of organic polysulfides as specified hereinbefore. Compositions prepared according to the present invention comprise dithiobiuret or a selected derivative thereof and an organic polysulfide or mixture of organic polysulfides in a suitable solvent or carrier, said solvent or carrier being present in a sufficient amount to provide convenient application. The dithiobiuret or derivative and the organic polysulfide are present in our compositions in a ratio of from 1:20 to 1:1, preferably from 1:9 to 1:4.

Compositions prepared according to the present invention are effective plant defoliants when applied in any suitable form such as solution, emulsion, suspension, dust, aerosol or the like. We have found that it is convenient to apply a dithiobiuret-disulfide composition as a suspension in a carrier such as an isoparaffinic hydrocarbon fraction.

Dithiobiuret and its derivatives as defined herein are ordinarily difficult to incorporate into admixture with certain other compounds because of their low solubility in most of the common solvents. We have found however, that stock solutions of dithiobiuret and its derivatives can be prepared employing pyridine, acetone, or Cellosolve (monoethyl ether of ethylene glycol) as solvents and that such solutions can subsequently be employed to provide formulations suitable for use in accordance with the manner of the present invention. The stock solutions, preferably saturated solutions, can be admixed with solutions or aqueous emulsions of disulfides or higher polysulfides. Since dithiobiuret or its derivatives are insoluble in said solutions or emulsions, the dithiobiuret or derivative is displaced as a suspension therein. When pyridine is used as a solvent in preparing stock solutions, the amount of pyridine in the final mixture is carefully controlled and maintained below its phytotoxic concentration, i. e. below 1 weight per cent of the final mixture.

We have found that a further suitable method of preparing formulations applicable to the present invention comprises the preparation of a stock solution of dithiobiuret in a solvent such as Cellosolve which is miscible with both hydrocarbon solvents and water. Thus a dispersion of dithiobiuret or its derivatives in either water or hydrocarbon carrier can be prepared.

We have also prepared pastes, by grinding dithiobiuret or its derivatives with a polysulfide in a ball mill or other suitable apparatus. Said pastes are then admixed with carriers such as isoparaffinic hydrocarbons to provide suspensions suitable for spraying.

EXAMPLE I

A test was conducted employing a composition prepared by grinding dithiobiuret and di-tert-butyl polysulfide together in a ball mill to form a paste and subsequently emulsifying said paste in water. The contents of said composition are listed in the following tabulation together with the defoliation data obtained with young bean plants:

| Formulation #1—.05 cc. per leaf | Percent Defoliation |
|---|---|
| 0.2 wt. percent di-tert-butyl polysulfide (50% S) | |
| 0.5 wt. percent dithiobiuret | 100 at 8 days. |
| 0.5 wt. percent emulsifier 1 (non-phytotoxic) | |
| 98.8 wt. percent water | |

1 Atlox 1045-A (polyoxyethylene sorbitol oleate laurate emulsifying agent).

These data show that the dithiobiuret-containing composition, according to the invention, had excellent defoliating activity. This activity was much greater than that of a mixture containing no dithiobiuret, but containing the other components shown above in the same proportions.

EXAMPLE II

Laboratory defoliation tests were run to compare the defoliating effect of di-tert-butyl polysulfide with compositions comprised of di-tert-butyl polysulfide and a small amount of dithiobiuret. All of the defoliants were applied in a 400–500° F. cut of HF heavy alkylate, an isoparaffinic hydrocarbon fraction containing a minimum of 98 per cent of isoparaffins, prepared by the hydrogen fluoride catalyzed alkylation of mixed butanes with ethylene.

Dithiobiuret is soluble in pyridine and formulated by preparing a 20 per cent stock solution of dithiobiuret in said solvent. A small amount of this stock solution was then added to HF alkylate containing di-tert-butyl polysulfide to form a colloidal suspension. The amount of pyridine present in the final mixture was below its phytotoxic concentration and was four times the amount of the dithiobiuret.

Comparative results of defoliation tests using compositions prepared according to the method of the present invention and using a standard 0.2 weight per cent solution of di-tert-butyl polysulfide are recorded below. Tests were conducted by treating the cotyledons (first leaves) of small cotton plants. These plants mature in about 30 days.

*The effect of additives on the defoliating action of tert-butyl polysulfide*

| Additive to tert-butyl polysulfide | | Percent tert-butyl Polysulfide | Defoliation in X Days | | | | Relative Activity of Combination |
|---|---|---|---|---|---|---|---|
| | | | Combination | | Standard | | |
| Compound | Percent | | Percent | Days | Percent | Days | |
| Dithiobiuret | .05 | .15 | 100 | 2.7 | 89 | 4.7 | Better. |
| Do | .05 | .15 | 100 | 2.0 | 77 | 5.3 | Do. |
| Do | .05 | .15 | 100 | 2.3 | 100 | 4.0 | Do. |
| Do | .025 | .175 | 100 | 2.7 | 100 | 3.8 | Do. |
| Do | .02 | .18 | 100 | 4.3 | 94 | 6.0 | Do. |

The above data show that the presence of from 0.02 to 0.05 weight per cent of dithiobiuret substantially improved the defoliating action of the sulfide-containing composition. In all tests the concentration of total defoliating agent (polysulfide and dithiobiuret) was 0.2 weight per cent.

EXAMPLE III

Defoliation tests were conducted to compare the defoliating effect of di-tert-butyl polysulfide with compositions comprised of di-tert-butyl polysulfide and dithiobiuret. All of the defoliants were applied in the form of aqueous emulsions with the total concentration of the defoliating agent in each case being 0.4 weight per cent. The results are shown in the following tabulation:

| Defoliant (weight percent in emulsion) | | Defoliation in X days |
|---|---|---|
| Dithiobiuret | t-butyl polysulfide | |
| 0.1 | 0.3 | 100 in 5 days. |
| 0.2 | 0.2 | 83 in 5.7 days. |
| | 0.4 (control) | 11 in 7.0 days. |
| | 0.4 (control) | 5 in 7.0 days. |

It is seen that the use of a mixture of dithiobiuret with the polysulfide was a much more effective defoliant than the polysulfide alone, with the total concentration of defoliating agent maintained constant.

Variation and modification are possible within the disclosure and claims to this invention the essence of which is that the defoliating activity of an organic polysulfide-containing defoliant composition is improved by the incorporation and presence therein of an activating amount of a dithiobiuret selected from the group consisting of dithiobiuret and N-alkyl, N-cycloalkyl, N-aryl, N-aralkyl, and N-alkaryl dithiobiurets, each of the N-substituent groups containing less than eleven carbon atoms.

We claim:
1. A defoliating composition comprising: an organic polysulfide having the formula $RS_xR'$, wherein R and R' are organic radicals selected from the group consisting of alkyl, cycloalkyl, aryl, alkaryl, and aralkyl radicals, R and R' each contain from 3 to 10 carbon atoms, and x is an integer from 2 to 5; and a proportion, sufficient to increase the defoliating activity of said polysulfide, of a dithiobiuret represented by the formula

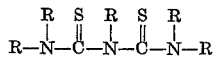

wherein R is a radical selected from the group consisting of hydrogen, alkyl, cycloalkyl, aryl, aralkyl, and alkaryl, each R containing less than 11 carbon atoms.

2. A defoliant composition comprising: an organic polysulfide represented by the formula $RS_xR'$, wherein R and R' are organic radicals selected from the group consisting of alkyl, cycloalkyl, aryl, alkaryl, and aralkyl, each containing from 3 to 10 carbon atoms, and x is an integer from 2 to 5; and a dithiobiuret represented by the formula

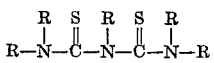

wherein R is a radical selected from the group consisting of hydrogen, alkyl, cycloalkyl, aryl, aralkyl, and alkaryl, each R containing less than 11 carbon atoms, said polysulfide and said dithiobiuret being dispersed in a carrier in a weight ratio in the range from 1 to 20 parts of said polysulfide per part of said dithiobiuret.

3. The composition of claim 2 in which said carrier is a hydrocarbon.

4. The composition of claim 2 in which said carrier is water.

5. A composition according to claim 2 wherein said polysulfide is di-(t-butyl) polysulfide, said dithiobiuret is 2,4-dithiobiuret, and said carrier is an isoparaffinic hydrocarbon fraction which boils in the range 400 to 500° F.

6. A composition according to claim 2 wherein said polysulfide is di-(t-butyl) polysulfide, said dithiobiuret is 2,4-dithiobiuret, and said carrier is water.

7. A defoliant having the following composition in weight per cent:

| | |
|---|---|
| Di-t-butyl polysulfide | 0.2 |
| 2,4-dithiobiuret | 0.5 |
| Emulsifier | 0.5 |
| Water | 98.8 |

8. A defoliant composition comprising from 0.05 to 0.2 weight per cent dithiobiuret, from 0.1 to 0.3 weight per cent di-t-butyl polysulfide, from 0.2 to 0.8 weight per cent pyridine, and the remainder an isoparaffinic alkylate fraction having a boiling range of 400 to 500° F.

9. A defoliating composition comprising: an organic polysulfide having the formula $RS_xR'$, wherein R and R' are organic radicals selected from the group consisting of alkyl, cycloalkyl, aryl, alkaryl, and aralkyl radicals, R and R' each contain from 3 to 10 carbon atoms, and x is an integer from 2 to 5; and a dithiobiuret represented by the formula

wherein R is a radical selected from the group consisting of hydrogen, alkyl, cycloalkyl, aryl, aralkyl and alkaryl, each R containing less than 11 carbon atoms, the weight ratio of said dithiobiuret to said polysulfide being in the range 1:20 to 1:1.

10. The composition of claim 9 in which said proportion is a weight ratio of said dithiobiuret to said sulfide in the range of from 1:9 to 1:4.

11. The composition of claim 9 in which said polysulfide is di-t-butyl trisulfide.

12. The composition of claim 9 in which said polysulfide is di-t-hexyl polysulfide.

13. The composition of claim 9 in which said polysulfide is di-t-octyl disulfide.

14. The composition of claim 9 in which said polysulfide is di-n-hexyl disulfide.

15. The composition of claim 9 in which said polysulfide is dicyclohexyl disulfide.

16. The composition of claim 9 in which said dithiobiuret is 2,4-dithiobiuret.

17. The composition of claim 9 in which said dithiobiuret is 1,5-diphenyl-2,4-dithiobiuret.

18. The composition of claim 9 in which said dithiobiuret is 1,5-diethyl-2,4-di-thiobiuret.

19. The composition of claim 9 in which said dithiobiuret is 1-ethyl-5-phenyl-2,4-dithiobiuret.

20. The composition of claim 9 in which said dithiobiuret is 1,5-ditolyl-2,4-dithiobiuret.

21. A method for defoliating plants which comprises placing upon said plants, in an amount sufficient to cause defoliation of said plants, a composition comprising an organic polysulfide having the formula $RS_xR'$, wherein R and R' are organic radicals selected from the group consisting of alkyl, cycloalkyl, aryl, alkaryl and aralkyl radicals, R and R' each contains from 3 to 10 carbon atoms, and x is an integer from 2 to 5; and a proportion, sufficient to increase the defoliating activity of said polysulfide, of a dithiobiuret represented by the formula

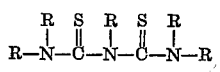

wherein R is a radical selected from the group consisting of hydrogen, alkyl, cycloalkyl, aryl, aralkyl, and alkaryl, each R containing less than 11 carbon atoms.

22. A method according to claim 21 wherein said polysulfide is di-(t-butyl) polysulfide, said dithiobiuret is 2,4-dithiobiuret, and said polysulfide and said dithiobiuret are applied to said plants as a dispersion in an isoparaffinic hydrocarbon fraction which boils in the range 400 to 500° F.

23. A method according to claim 21 wherein said polysulfide is di-(t-butyl) polysulfide, said dithiobiuret is 2,4-dithiobiuret, and said polysulfide and said dithiobiuret are applied to said plants as a dispersion in water.

24. A process for defoliating bean plants which comprises applying thereto, in an amount sufficient to cause defoliation thereof, a composition comprising an organic polysulfide having the formula $RS_xR'$, wherein R and R' are organic radicals selected from the group consisting of alkyl, cycloalkyl, aryl, alkaryl, and aralkyl radicals, R and R' each contains from 3 to 10 carbon atoms, and x is an integer from 2 to 5; and a dithiobiuret represented by the formula

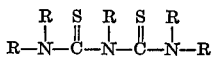

wherein R is a radical selected from the group consisting of hydrogen, alkyl, cycloalkyl, aryl, aralkyl, and alkaryl, each R containing less than 11 carbon atoms, the weight ratio of said dithiobiuret to said polysulfide being in the range of 1:20 to 1:1.

25. A process for defoliating cotton plants which comprises applying thereto, in an amount sufficient to cause defoliation thereof, a composition comprising an organic polysulfide having the formula $RS_xR'$, wherein R and R' are organic radicals selected from the group consisting of alkyl, cycloalkyl, aryl, alkaryl and aralkyl radicals, R and R' each contains from 3 to 10 carbon atoms, and x is an integer from 2 to 5; and a dithiobiuret represented by the formula

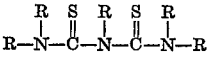

wherein R is a radical selected from the group consisting of hydrogen, alkyl, cycloalkyl, aryl, aralkyl and alkaryl, each R containing less than 11 carbon atoms, the weight ratio of said dithiobiuret to said polysulfide being in the range of 1:20 to 1:1.

References Cited in the file of this patent

UNITED STATES PATENTS 2,410,862    Bousquet et al. _____ Nov. 12, 1946

OTHER REFERENCES

Chemical Abstracts, vol. 46 (1952), cols. 5773 and 5774 abstract of article of Weintraub et al.